U S 0 0 8 8 2 4 8 8 0 B 2

US008824880B2

(12) United States Patent
Wang

(10) Patent No.: US 8,824,880 B2
(45) Date of Patent: Sep. 2, 2014

(54) INTEGRATED IMAGING SYSTEM

(75) Inventor: Lingli Wang, Bad Kreuznach (DE)

(73) Assignee: Jos. Schneider Optische Werke GmbH, Bad Kreuznach (DE)

( * ) Notice: Subject to any disclaimer, the term of this patent is extended or adjusted under 35 U.S.C. 154(b) by 0 days.

(21) Appl. No.: 13/582,657

(22) PCT Filed: Feb. 23, 2011

(86) PCT No.: PCT/EP2011/000867
§ 371 (c)(1),
(2), (4) Date: Sep. 4, 2012

(87) PCT Pub. No.: WO2011/107230
PCT Pub. Date: Sep. 9, 2011

(65) Prior Publication Data
US 2012/0327292 A1 Dec. 27, 2012

(30) Foreign Application Priority Data
Mar. 4, 2010 (DE) .................. 10 2010 010 328

(51) Int. Cl.
*G03B 13/36* (2006.01)
*G03B 15/00* (2006.01)
*G02B 26/00* (2006.01)
*G02B 13/00* (2006.01)
*G02B 15/00* (2006.01)
*G02B 3/14* (2006.01)

(52) U.S. Cl.
CPC ............... *G02B 13/009* (2013.01); *G02B 3/14* (2013.01); *G02B 26/005* (2013.01); *G02B 15/00* (2013.01)
USPC .............................. 396/79; 396/111; 396/351

(58) Field of Classification Search
USPC ....................... 396/72, 79, 111, 351
See application file for complete search history.

(56) References Cited

U.S. PATENT DOCUMENTS 7,269,344 B2 * 9/2007 Nishioka et al. ............... 396/60
7,443,596 B1 10/2008 Berge
(Continued)

FOREIGN PATENT DOCUMENTS

| EP | 1906654 A1 | 4/2008 |
| WO | 2007055742 A2 | 5/2007 |
| WO | 2008100154 A1 | 8/2008 |

OTHER PUBLICATIONS

J. Jahns: "Integrated optical imaging system", Appl. Opt. 29 (1990) 1998.

*Primary Examiner* — W B Perkey
(74) *Attorney, Agent, or Firm* — IPXLAW Group LLP; Claude A. S. Hamrick

(57) ABSTRACT

An imaging system having a front side and rear side enveloping a light transmitting space formed therebetween A front lens situated on the front side forms a portal through which light from an object enters into the light transmitting space wherein at least one optical element composed of glass or elastic material, liquid lenses or liquid crystal elements, and an image sensor are positioned to develop a folded beam path between the front lens and the image sensor, and a real image of the object on the image sensor. Electrically driving at least one optical element enables alteration of the focal length within the system in a manner switchable between at least two values. The change in focal length is realized with the aid of electrically controlled piezo-actuators or by an electric field applied to at least one variable optical element.

8 Claims, 2 Drawing Sheets

(56) References Cited

U.S. PATENT DOCUMENTS

2002/0181126 A1* 12/2002 Nishioka ............... 359/726
2005/0243439 A1 11/2005 Tomita et al.
2007/0053673 A1* 3/2007 Seo et al. ............... 396/111
2012/0327292 A1* 12/2012 Wang ..................... 348/360

* cited by examiner

INTEGRATED IMAGING SYSTEM

CROSS REFERENCE TO RELATED APPLICATION

This application is related to pending U.S. application Ser. No. 13/579,909 filed Aug. 17, 2012 entitled "Imaging System" invented by Lingli WANG of Bad Kreuznach, Germany, the disclosure of which is expressly incorporated herein by reference.

DESCRIPTION

1. Field of the Invention

The invention relates to an imaging system for imaging an object onto an image sensor.

2. Prior Art

The trend in the development of optical modules, in particular for mobile radio devices (cell phones), is increasingly toward a very flat design. In this case, increasingly a construction is preferred in which a plurality of optical elements having selected refractive, diffractive, transmissive or reflective properties are combined with one another in order to realize the desired beam path and to produce an imaging on an image sensor (see FIG. 1; or e.g., J. Jahns: "Integrated optical imaging system", Appl. Opt. 29 (1990) 1998).

The constantly increasing requirements made in respect of the flattest possible construction of the modules impose limits, however, for the previously used devices and systems, particularly also with regard to the variability of the focal length.

PROBLEM

The problem addressed by the invention is that of proposing an imaging system for imaging an object onto an image sensor which has a very flat design in combination with the realization of at least two different focal lengths.

SOLUTION

This problem is solved by means of the invention comprising the features of the independent claim. Advantageous developments of the invention are characterized in the dependent claims. The wording of all claims is hereby incorporated by reference in the content of the description. The invention also encompasses all expedient and in particular all mentioned combinations of independent and/or dependent claims.

The imaging system is described in greater detail below.

An imaging system for imaging an object onto an image sensor is proposed. The light traverses overall a beam path between object and image sensor, through a (transparent) carrier, consisting of a solid transparent material or of an outer sheath filled with air, on which one or a plurality of passive or/and active optical components are mounted. The aim of said optical components is to be able to adjust the optical focal length of the system continuously or discretely by changing (switching) the optical distance (changing the focal lengths of the active elements and/or altering the optical path length) from the entrance lens to the sensor.

In an imaging system, light is deflected by a spatial arrangement of optical elements. The deflection of the light is achieved by optical elements that use different optical effects, for instance:

a. refraction (change in the direction of the light from one transparent medium into another, provided that the light does not penetrate through the interface between the media perpendicularly);
b. diffraction; and
c. reflection (light is thrown back where it impinges on an interface between two media having different optical properties).

The optical elements can be lenses, mirrors, gratings, holograms, and other elements having optical properties which are appropriate for the desired beam path.

The image sensor is situated at the end of the beam path, in the image plane into which the object is imaged with the aid of the elements. The image sensor is generally embodied as a sensor of CCD or CMOS type. In principle, however, any conceivable sensors such as films, electronic image sensors, scanning photo detectors, etc., may be used.

The imaging system has a front side facing the object and a rear side, which faces away from the object and which is arranged behind the front side, as viewed from the object.

Situated on the front side is a front lens (or combination of a plurality of lenses), through which light coming from the object enters into the imaging system. The front lens can be embodied e.g., as a plane or curved surface or as a lens system. These elements can likewise be rigid or variable.

The imaging system also comprises at least one optical element which is arranged on the rear side or front side and can influence the beam path within the imaging system in such a way that a folded beam path arises between front lens and image sensor, and that a real image of the object arises on the image sensor. The front side and rear side together with the folded beam path form a planar optical system.

The at least one optical element is embodied in such a way that the focal length of the imaging system can be altered by means of an electrical driving of the at least one optical element.

As a result, at least one first value of the focal length and a second value, different than the first, of the focal length can be set for the imaging system depending on the electrical switching state of the at least one optical element.

The different focal lengths are set by changing (deflecting) the beam path upon passing through the at least one optical element. However, it is also possible to arrange two, three or more electrically drivable optical elements in the beam path.

The overall beam path within the system, as far as the image sensor is concerned, is dependent on how many electrically drivable optical elements are arranged in the beam path and is influenced by the specific optical properties thereof. The specifications of said optical elements are determined by the desired form of the imaging(s) of the object onto the image sensor, in particular by the desired magnification or focal length.

The imaging quality can be influenced or improved by a plurality of optical elements, also on the front side. The rays traverse different optical elements along the beam path. In this case, the rays are generally alternately reflected at front side and rear side, as a result of which a "folding" of the beam path is realized.

Both zoom lenses and lenses having a variable focal length can be realized by means of the proposed system. A zoom lens is understood to be a lens having a focal length that is continuously variable in a specific range. A variable focal length is understood to mean a variation of the focal length in discrete steps.

One advantageous embodiment of the proposed solution also makes it possible for the focal length of the imaging system to be continuously adjustable by means of an electrical driving of the at least one optical element.

In another advantageous embodiment of the imaging system, at least one optical property of at least one optical element can be changed by means of an electrical driving. By way of example, lenses having a controllable focal length shall be mentioned, such as e.g., a. membrane lenses, in which the membrane is embodied in reflective fashion and the focal length can be altered by means of a mechanical or electrical driving;

b. lenses having variable focal lengths on the basis of liquid crystals and electro-optical materials, or c. liquid lenses, in this case inter alia the known "electrowetting lens systems".

These advantageous examples shall be explained in greater detail below.

By way of example, the optical element comprises an elastic material. In this advantageous embodiment, the change in the at least one optical property of the at least one optical element is achieved by changing the geometrical form thereof.

In this case, the optical element is, for example, a lens composed of a transparent, elastic material. In particular, said change in the geometrical form concerns the radius of curvature of the lens surfaces.

It is also advantageous if this electrically switchable change in the geometrical form of the at least one optical element is brought about by an electrostatic force action or a piezoelectric force action. In this case, when a control voltage is switched on, the electrostatic attraction (or repulsion), or the mechanical change of piezoelectric element affects the elastic curvature surface of the lens and alters the radius thereof. As a result of this, the optical properties of the lens are changed and a changed value of the focal length is set. If the control voltage applied to the electrostatic actuator or the piezo-actuator is switched off again, then the original geometrical form of the lens is reestablished and the original value of the focal length is thus set.

The functioning of a piezo-actuator is based on piezoelectricity (also called piezoelectric effect). Piezoelectricity describes the change in electrical polarization and thus the occurrence of an electrical voltage at certain solid bodies when they are elastically deformed (direct piezoelectric effect). Conversely, certain materials deform when an electrical voltage is applied (inverse piezoelectric effect). As a result of the directed deformation of a piezoelectric material, microscopic dipoles form within the elementary cells. Summation by way of the associated electric field in all of the elementary cells of the crystal results in a macroscopically measurable electrical voltage. Conversely, by applying an electrical voltage it is possible to achieve a deformation of a component composed of piezoceramic.

Another of the advantageous examples mentioned concerns liquid lenses. In this example, the at least one optical element has a liquid lens. By applying an electrical voltage to the optical element, it is possible to alter at least one optical property of the liquid lens.

A liquid lens generally consists of an aqueous solution and an oil. The two liquids have different refractive indices and do not mix. A liquid lens can be constructed, for example, in such a way that the two liquids are situated in a short tubular container, at the ends of which transparent end caps are arranged. One of the end caps and the wall interior surfaces of the tubular container are provided with a water-repellent coating. This has the effect that the aqueous solution collects at the non-coated end of the tube and collects there to form a hemispherical mass. This hemispherical mass forms a lens-shaped body, which also has the optical properties of a lens, for example of a convex lens.

With the aid of an electric field generated at the liquid lens, within a few milliseconds it is possible to realize an alteration of the geometrical form (e.g. of the radius of curvature) of the surface of the lens-shaped liquid drop.

Consequently, the lens form can be controlled electrically. The applied electric field reduces the water-repellant effect of the coating. As a result, the aqueous solution wets the sidewalls of the tubular container to a greater extent and the radius of curvature of the curved surface between the two liquids and the focal length of the lens change when the voltage at the electrodes of the liquid lens is switched on or off. By means of the change (increase or decrease) it is even possible to obtain an alteration of the lens form from convex to plane or concave.

The advantageous embodiment of the imaging system is also possible in such a way that the at least one optical element has a liquid crystal element and a Fresnel lens.

In the case of this advantageous arrangement, at least one optical property of the optical element can also be altered by an electrical voltage being applied to the optical element.

A liquid crystal is a substance which on the one hand is liquid, like a liquid substance, but on the other hand also has direction-dependent (anisotropic) physical properties, like a crystal. This particular combination of fluidity and anisotropy makes liquid crystals technologically interesting, primarily for liquid crystal screens, but also increasingly for use in optical elements, e.g., in liquid crystal lenses. Liquid crystals generally exhibit their properties when dissolved in a suitable solvent, often e.g., water. Most liquid crystals are optically birefringent.

vThermotropic liquid crystals are usually used in optics. These liquid crystals occur during the heating of specific substances upon melting at an intermediate phase (mesophase) between the solid phase and liquid phase. Substances of this type can, as the temperature increases, successively form a plurality of different liquid crystalline phases that differ significantly from one another in terms of their microscopic structure and their macroscopic appearance, e.g., a. the nematic phases,
b. the smectic phases,
c. the columnar phases.

The nematic phase is the simplest type of liquid crystalline phase. The nematic phase is generally formed from a system comprising elongated, cigar-shaped molecules. In this phase said molecules have an orientational order with respect to a so-called director, the unit vector of direction. The ensuing preferred orientation is generally constant only for small volumes. The preferred orientations of the small volumes are statistically distributed. No long-arranged order whatsoever occurs. An isotropic distribution appears to be present on a macroscopic scale.

Generally, the degree of order of the liquid crystal molecules and the associated long-range orientational order decrease as the temperature increases. Accordingly, the physical properties, such as e.g., the refractive index, depend on the temperature.

However, the molecules of a nematic phase can be aligned by an electric field. The preferred directions in the small volumes are thereby aligned in the same direction, as a result of which a macroscopically anisotropic order arises. This field-induced alignment takes place without temperature changes, i.e., within the nematic phase, without a temperature-induced phase transition.

In the macroscopically ordered phase, the refractive index is increased for the polarization direction parallel to the orientation of the molecules of the liquid crystal. Light polarized perpendicular to the alignment is blocked or greatly absorbed.

The targeted alignment of the liquid crystal molecules by an electrical circuit arrangement is effected by electrodes being fitted to the liquid crystal element. Said electrodes are connected to one or a plurality of voltage sources which can be switched on and off independently of one another.

The electrodes are fitted to the optical element or liquid crystal element in a manner structured according to the desired function. When the voltage is switched on, an electric field is generated by means of the electrodes at the liquid crystal element, said electric field causing a regionally changed alignment of the preoriented liquid crystal molecules. Consequently, regions having a different refractive index arise in the liquid crystal element. In this case, the refractive index is increased in the regions with orientation of the liquid crystal molecules by means of the electric field for a suitable polarization direction.

A Fresnel lens or more precisely a Fresnel stepped lens is an optical lens in which weight and volume are reduced by comparison with a customary optical lens with the same diameter and the same focal length. This has an effect particularly in the case of lenses having a short focal length, which in a normal form are very thick and heavy. In Fresnel lenses, the volume is reduced by division into ring-shaped regions. The thickness is reduced in each of these regions, such that the lens acquires a series of ring-shaped steps. Since light is refracted only when passing through the lens surfaces, the angle of refraction is not dependent on the thickness, but rather only on the angle between the two surfaces. The lens maintains its focal length, but the imaging quality is impaired by the stepped structure. Fresnel lenses are generally used where the weight of the lenses is crucial and the imaging quality is of secondary importance.

If a Fresnel lens is covered with a liquid crystal, then the refractive index of the liquid crystal can be electrically switched. It can be switched e.g., such that, in one switching state, there is a jump in refractive index between the material of the Fresnel lens and the liquid crystal, as a result of which the Fresnel lens has an effect. In the other switching state, the refractive index difference can disappear, such that the Fresnel lens does not have an effect. In this way, the effect of the Fresnel lens can be switched on and off.

It is also conceivable for only one variable optical element to be present in the imaging system. In this case, the optical element can be designed in such a way that, by means of electrical driving, it is both displaceable in its position along an axis and its geometrical form (e.g. the curvature of the lens surfaces) is also variable, and a change in the focal length is thus brought about by this combination of the variable properties.

Refraction in a lens or a prism always leads to dispersion, i.e., color splitting. In the construction of a lens assembly, the dispersion is minimized (color-corrected) by using glasses having different refractive indices and/or other measures. In the present planar construction, dispersion is not present as long as the beam path occurs by way of reflection at the optical surfaces. Lenses or prisms in transmission result in disturbing dispersion, but can be minimized by suitable combination or with the aid of diffractive elements.

Therefore, the imaging system is preferably embodied as a catadioptric system, i.e., as a mirror-lens system, wherein all optical elements beyond the front lens are (curved) mirrors. In this configuration, the optical element is particularly suitable for influencing the beam path for polychromatic light. The term polychromatic light (Greek: polychromos, meaning virtually "multicolored") or white light denotes light which consists of a mixture of different colors. Polychromatic light is a mixture of many wavelengths.

Further details and features will become apparent from the following description of preferred exemplary embodiments in conjunction with the dependent claims. In this case, the respective features can be realized by themselves or as a plurality in combination with one another. The possibilities for solving the problem are not restricted to the exemplary embodiments.

The exemplary embodiments are illustrated schematically in the figures. In this case, identical reference numerals in the individual figures designate elements that are identical or functionally identical or correspond to one another with regard to their functions. In the figures, specifically:

IN THE DRAWING

DESCRIPTION OF THE EMBODIMENTS

Figure 1:
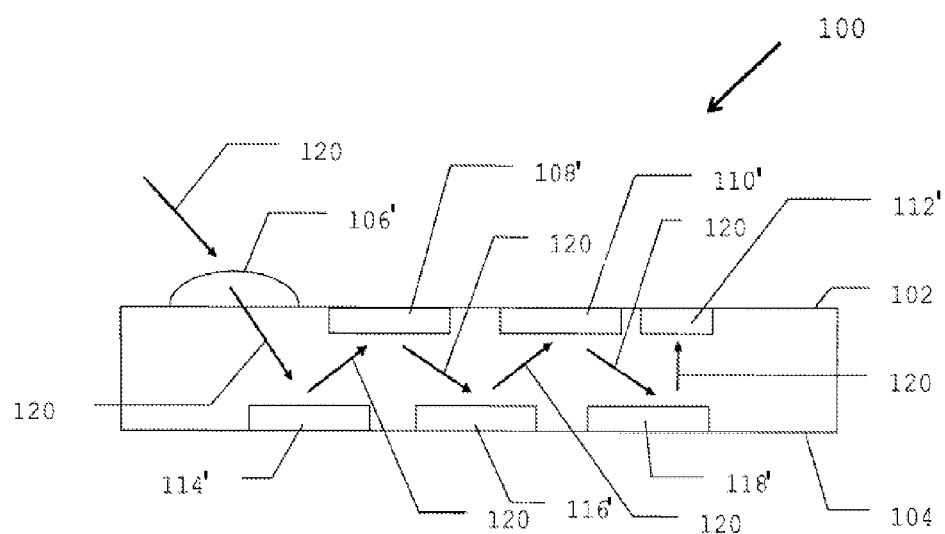
FIG. 1 shows a schematic illustration of a planar imaging system in accordance with the prior art.

FIG. 1 schematically shows an imaging system 100' corresponding to the prior art having a fixed focal length. (primed numbers, i.e., in the form "nn'", are used to distinguish elements of this prior art apparatus from similarly numbered elements in the subsequently described embodiments of the present invention.) The system 100' shown has a front side 102' and a rear side 104'. A front lens 106', two optical elements 108', 110', and an image sensor 112' are situated at the front side 102'. An optical element 114', an optical element 116', and an optical element 118' are arranged opposite at the rear side 104' of the system 100' shown. The optical elements 108', 110', 114', 116' and 118' can have refractive or diffractive, transmissive or reflective optical properties.

The beam path 120 runs from the object (not illustrated) through the front lens 106' to the first optical element 114', further via the second optical element 108', the third optical element 116', the fourth optical element 110' and the fifth optical element 118' to the image sensor 112', on which the object is imaged.

Figure 2:
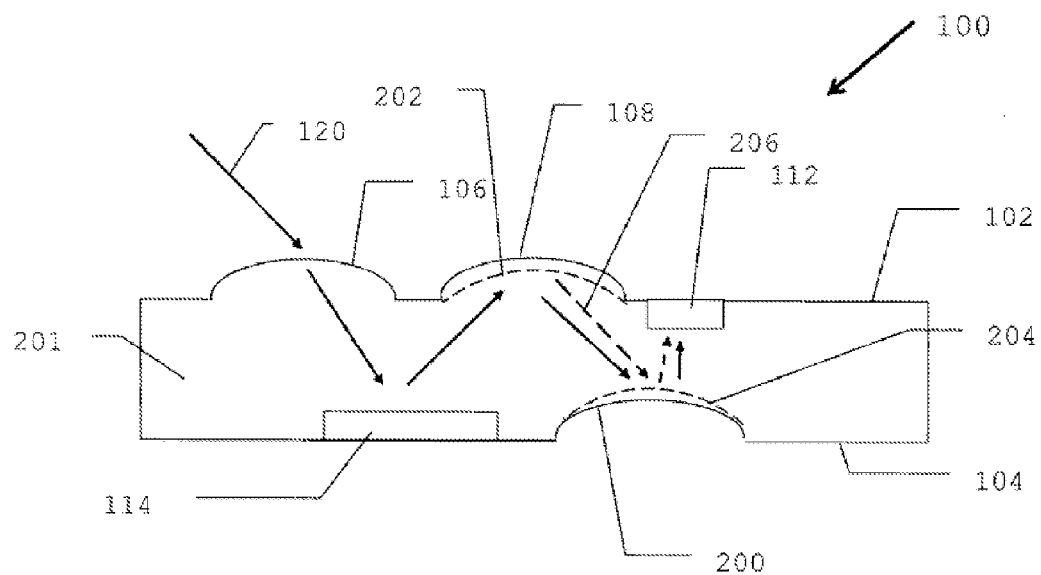
FIG. 2 shows a schematic illustration of a planar imaging system having a variable focal length.

FIG. 2 schematically illustrates an exemplary embodiment of the present invention forming an imaging system 100 (e.g., of a camera module) in accordance with the present invention but having a variable focal length.

The illustrated system 100 includes means forming a front side 102 and means forming a rear side 104 enveloping a light transmitting volume of space 201 therebetween. The space 201 between the front side 102 and the rear side 104 can be filled with air or other optically transparent fluid material, but can also be embodied as an optically transparent solid light carrier material. A front lens 106 (or combination of lens 106) forming a light inlet means, an optical element 108 and an image sensor 112 are situated on the front side 102. Two optical elements 114, 200 are arranged opposite on the rear side 104 of the imaging system 100 shown. The optical element 114 can have refractive or diffractive, transmissive or reflective optical properties.

The beam path 120 runs from the object (not illustrated) through the front lens 106 and via the optical elements 114, 108 and 200 to the image sensor 112 on which the object is imaged. The beam path is folded by the elements 114, 108 and 200, and in one functional configuration is defined by a specific first focal length.

By means of an electrically switchable driving of at least one of the optical elements 108 and 200, it is possible to set a change in the focal length to at least one other value, different than the first focal length, and thus to vary the real image of the object imaged on the image sensor 112, as a result of which a sought zoom property of the imaging system 100 is realized in accordance with the present invention.

In this case, the change in the focal length of the imaging system 100 is realized by means of an electrically switchable change in the optical properties (e.g., the radii of the curvature surfaces) of at least one of the optical elements 108 and 200 or by an alteration of their position within the beam path 120. By way of example, a new position 202 of the surface arises for the optical element 108. A new position 204 of the surface may similarly arise for the optical element 200. This results in an altered beam path 206 of the imaging system 100.

Consequently, by means of this changeover between two different focal lengths within the imaging system 100 described by way of example, an imaging system 100 having at least two discretely switchable different focal lengths can be realized. Depending on the concrete configuration of the electrical changeover mechanism, a plurality of different focal lengths can also be obtained.

Figure 3:
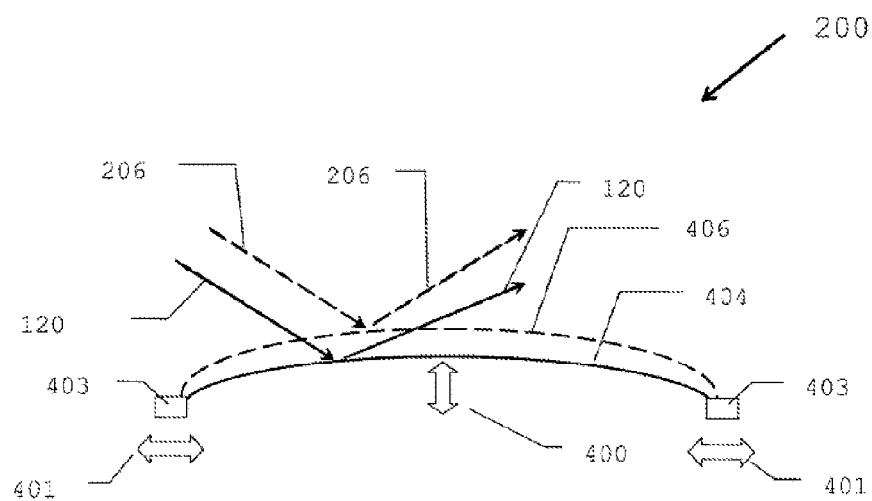
FIG. 3 shows a schematic illustration of an optical element with means for form alteration by an electrically switchable piezo-element (piezo-actuator)

One example of an advantageous embodiment of the optical element 200 for realizing a zoom within the imaging system 100 is shown in FIG. 3. It is to be understood that the optical element 108 could be similarly configured.

In this exemplary embodiment, the optical element 200 is a lens composed of an elastic material. An electrical voltage is applied to a piezo-actuator (not illustrated). The piezo-actuator is arranged such that when the voltage is applied, the piezo-actuator acts on the elastic lens in a similar manner to a piston (shift 400) and thereby brings about a change in the original lens form (lens curvature) 404. The change in the lens form can likewise be achieved by a change in the radius (shift 401) of the lens holder 403. The altered lens form, as illustrated by the dashed line 406, results in a change in its optical properties, namely the focal length. As a result, the optical element 200 influences the focal length of the lens 200. Consequently, the original beam path 120 of the light rays is altered and an altered beam path 206 is produced. As a result of this, the value of the focal length is altered in a manner dependent on the voltage applied to the piezo-actuator and a zoom is thus realized. As indicated above, a similar change in curvature of an appropriately configured elastic reflector lens can be accomplished by application of electrostatic attraction and/or repulsion forces thereto.

Figure 4:
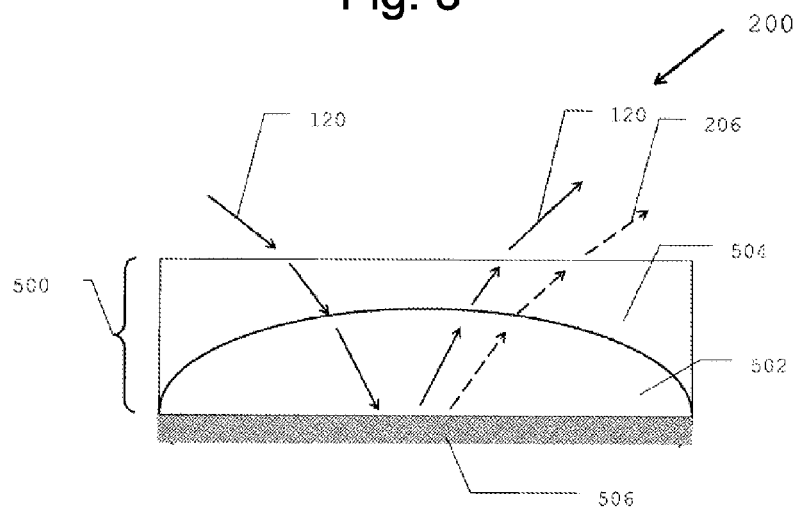
FIG. 4 shows a schematic illustration of an electrically switchable liquid lens.

Another advantageous embodiment of the optical element 200 is shown schematically in FIG. 4. In this example, the optical element 200 has a liquid lens 500. The liquid lens 500 consists of the actual lens liquid 502 and a liquid 504 surrounding the latter. A reflective material 506 is arranged at the underside of the liquid lens. It is to be understood that the optical element 108 could be similarly configured.

The liquid lens is arranged in a lens holder provided with electrodes (e.g., ITO electrodes; not illustrated). A voltage can be applied to the electrodes, as a result of which an electric field is generated between the electrodes. When the voltage is switched on, the optical properties of the liquid lens are varied in a targeted manner by virtue of the surface tension between the two liquids changing, as a result of which the radius of curvature of the interface changes. This alteration of the optical properties of the liquid lens brings about an alteration of the focal length of the liquid lens and thus an altered beam path 206. As a result of this, when the voltage is switched on at the electrodes, a changed value of the focal length of the imaging system and thus a zoom are realized.

Figure 5:
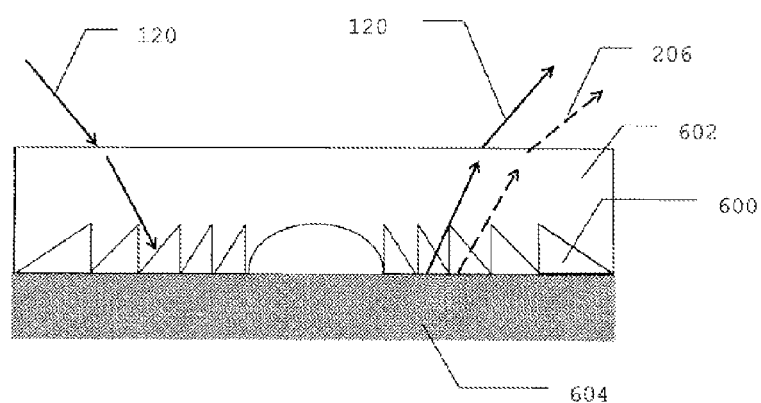
FIG. 5 shows a schematic illustration of an electrically switchable liquid crystal element in combination with a Fresnel lens.

The optical element 200 illustrated schematically in FIG. 5 is a combination of a liquid crystal 602 and a Fresnel lens 600. A reflective material 604 is arranged at that side of the optical element 200 which faces away from the light 120 incident on the object side, such that the beam path 120 is reflected in the direction of the image sensor. The Fresnel lens 600 is produced from a dielectric material, for example plastic. It is to be understood that the optical element 108 could be similarly configured.

The beam path 120 of the light radiation entering on the object side is determined by the optical properties both of the liquid crystal 602 and of the Fresnel lens 600. Electrodes (not illustrated) are arranged on the optical element 200, the electrodes being connected to a voltage source via conductor tracks.

The optical properties (refractive index) of the liquid crystal 602 are altered electronically by the voltage source being switched on or off, as a result of which the electrodes are activated or deactivated. The beam path of the emerging light radiation 206, i.e., the deflection angle, can be changed electronically as a result. The change in the optical properties of the liquid crystal 602 as a result of the activation or deactivation of the electrodes is effected in a manner analogous to that already described above.

When the voltage source is switched off, the liquid crystal 602 of the optical element 200 has an isotropic distribution of the preferred directions.

Switching on the voltage at the electrodes results in an altered alignment of the liquid crystal 602 along the propagation direction 120 of the light and in a change in the refractive index for both polarization directions. This together with the specially shaped plastic surface of the Fresnel lens 600 results in a deflection of the ray 206 passing through the optical element 200.

The degree of alignment of the liquid crystal 602 is dependent on the magnitude of the applied voltage. However, the degree of alignment also determines the extent of the change in the refractive index. This influences the focal length. Therefore, the focal length is controllable by means of the applied voltage. This opens up the possibility of realizing further focal lengths.

REFERENCE SIGNS

100 Imaging system
102 Front side
104 Rear side
106 Front lens
108 Optical element
110 Optical element
112 Image sensor
114 Optical element
116 Optical element
118 Optical element
120 Original beam path
200 Optical element
201 Air-filled space or carrier material between front side and rear sides of the optical element 202 New position of the surface of the optical element 108
204 New position of the surface of the optical element 200
206 Altered beam path
400 Shift
404 Radius of curvature
406 Altered radius of curvature
401 Shift
403 Lens mount with variable radius (shift)
500 Liquid lens
502 Lens liquid
504 Surrounding liquid
506 Reflective material
600 Fresnel lens
602 Liquid crystal
604 Reflective material

The invention claimed is:

1. An imaging system for imaging an object onto an image sensor and wherein light traverses a beam path between the object and the image sensor, the imaging system comprising:
  a) a front side facing the object;
  b) a rear side which faces away from the object and which is arranged behind the front side, as viewed from the object;
  c) a front lens or lens combination on the front side through which light coming from the object enters into the imaging system;
  d) at least one optical element which is arranged on the rear side or front side and can influence the beam path within the imaging system in such a way
    d1) that a folded beam path arises between front lens and image sensor, and
    d2) that a real image of the object arises on the image sensor;
characterized
  e) in that the at least one optical element has a liquid lens;
  f) in that a reflective material is arranged at the underside of the liquid lens;
  g) in that at least one optical property of the liquid lens can be altered by an electrical voltage being applied to the liquid lens;
  h) in that the liquid lens is embodied in such a way that the focal length of the imaging system can be altered by means of an electrical driving of the liquid lens;
  i) as a result of which at least one first value of the focal length and a second value, different than the first value, of the focal length can be set for the imaging system depending on the electrical switching state of the liquid lens.

2. An imaging system for imaging an object onto an image sensor, wherein light traverses a beam path between the object and the image sensor, wherein the imaging system comprises:
  a) a front side facing the object;
  b) a rear side, which faces away from the object and which is arranged behind the front side, as viewed from the object;
  c) a front lens or lens combination on the front side, through which light coming from the object enters into the imaging system;
  d) at least one optical element which is arranged on the rear side or front side and can influence the beam path within the imaging system in such a way
    d1) that a folded beam path arises between front lens and image sensor, and
    d2) that a real image of the object arises on the image sensor;
  e) wherein at least one optical property of the at least one optical element can be changed by an electrical driving;
characterized
  f) in that the optical element comprises an elastic material;
  g) in that the change in the at least one optical property of the at least one optical element is achieved by changing the geometrical form thereof;
  h) in that the at least one optical element is embodied in such a way that the focal length of the imaging system can be altered by means of an electrical driving of the at least one optical element;
  i) as a result of which at least one first value of the focal length and a second value, different than the first, of the focal length can be set for the imaging system depending on the electrical switching state of the at least one optical element.

3. An imaging system for imaging an object along a beam path and onto an image sensor, comprising:
  a) first means forming a front side facing the object;
  b) second means forming a rear side facing away from the object, the front and rear sides enveloping a light transmitting space therebetween;
  c) a front lens means associated with the front side and through which light from the object enters the light transmitting space and is conducted therethrough along a beam path;
  d) an image sensor disposed along the beam path;
  e) at least one electrically responsive optical element disposed along the beam path and operative to variably fold the beam path between the front lens means and the image sensor in response to an applied electrical signal and thus influence the focal length of the imaging system;
  e1) wherein the at least one optical element includes a liquid lens having a reflective material arranged at the underside thereof, and wherein at least one optical property of the liquid lens is alterable by a variable electrical field created across the lens by application of a voltage applied to electrodes forming a part thereof.

4. An imaging system for imaging an object along a beam path and onto an image sensor, comprising:
  a) first means forming a front side facing the object;
  b) second means forming a rear side facing away from the object, the front and rear sides enveloping a light transmitting space therebetween;
  c) a front lens means associated with the front side and through which light from the object enters the light transmitting space and is conducted therethrough along a beam path;
  d) an image sensor disposed along the beam path;
  e) at least one electrically responsive optical element disposed along the beam path and operative to variably fold the beam path between the front lens means and the image sensor in response to an applied electrical signal and thus influence the focal length of the imaging system; and
  f) at least one other optical element disposed along the beam path and operative to fold the beam path between the front lens means and the image sensor, and to respond to an applied electrical signal and influence the focal length of the imaging system.

5. An imaging system as recited in claim 4 wherein the at least one other optical element includes a lens made of an elastic material in combination with at least one electrically responsive piezo-electric actuator operative to change the position or curvature of the lens.

6. An imaging system as recited in claim 4 wherein the at least one other optical element includes a liquid lens having a reflective material arranged at the underside thereof, and wherein at least one optical property of the liquid lens is alterable by a variable electrical field created across the lens by application of a voltage applied to electrodes forming a part thereof.

7. An imaging system as recited in claim 4 wherein the at least one other optical element includes
- f1) an electrically responsive liquid crystal,
- f2) means forming a light reflective surface, and
- f3) a Fresnel lens disposed between the liquid crystal and the reflective surface,
- wherein the application of a voltage to the liquid crystal causes a change in the refractive index of the crystal resulting in deflection of light passing into and through the crystal and the Fresnel lens, and reflected by the reflective surface.

8. An imaging system as recited in claim 4 wherein all optical elements between the front lens and the image sensor are curved mirrors.

\* \* \* \* \*